Oct. 25, 1960  F. E. EYSTER  2,957,573
POWER TURN FOR CONVEYORS
Filed Nov. 17, 1958  2 Sheets-Sheet 1
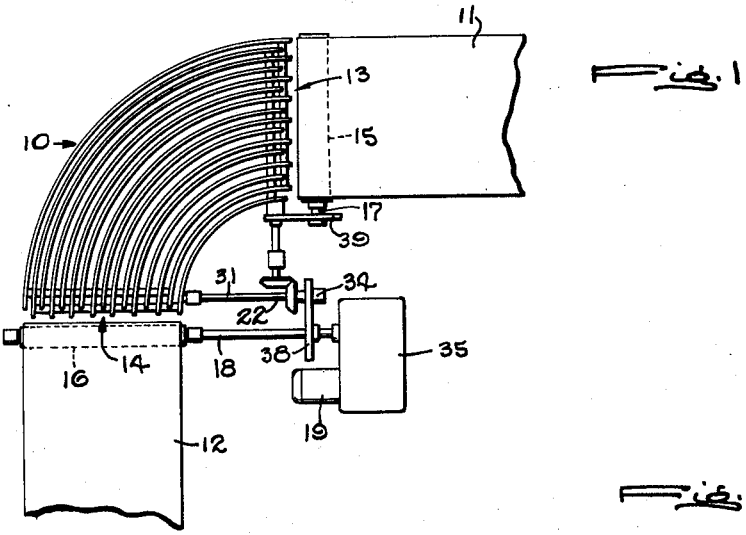
Fig. 1
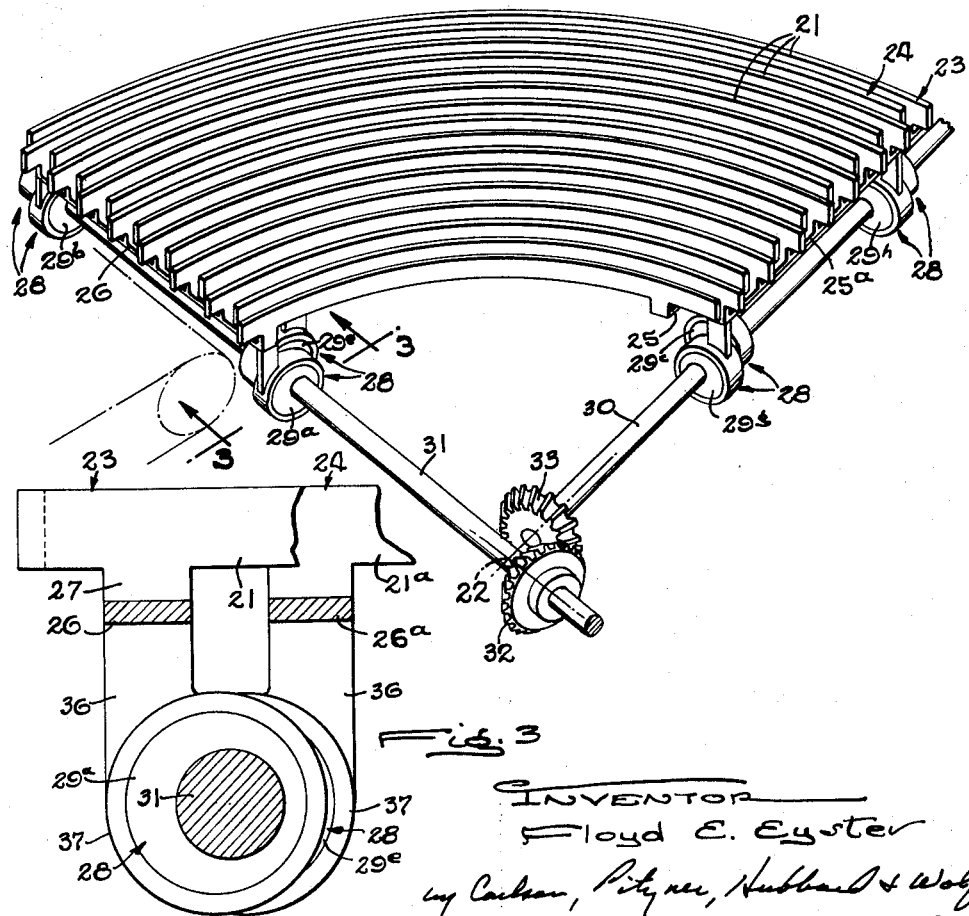
Fig. 2
Fig. 3
INVENTOR
Floyd E. Eyster
by Carlson, Pitzner, Hubbard & Wolfe
ATTORNEYS Oct. 25, 1960   F. E. EYSTER   2,957,573
POWER TURN FOR CONVEYORS
Filed Nov. 17, 1958   2 Sheets-Sheet 2

INVENTOR
Floyd E. Eyster
by Carlson, Pitzner, Hubbard & Wolfe
ATTORNEYS

United States Patent Office 2,957,573
Patented Oct. 25, 1960

2,957,573

POWER TURN FOR CONVEYORS

Floyd E. Eyster, Forest Hills Road, Rockford, Ill.

Filed Nov. 17, 1958, Ser. No. 774,327

6 Claims. (Cl. 198—219)

This invention relates to a power turn for conveyors having a platform comprising parallel curved bars concentric with the axis of the turn. More specificially, the invention relates to a power turn in which the parallel bars are gyrated in circular orbits about a horizontal axis which intersects the axis of the turn.

The principal object of the invention is to provide in a power turn of the above character a comparatively simple mechanism for gyrating the curved bars.

Another object is to effect the gyration of the bars by eccentrics mounted on shafts radiating from the axis of the turn to underlie the platform.

The invention also resides in carrying the articles in a curved path about the axis of the turn through the provision of novel means for progressively increasing orbits of gyration outwardly from the axis of the turn.

Other objects and advantages of the invention will become apparent from the following detailed description taken in connection with the accompanying drawings, in which Figure 1 is a plan view of a conveyor turn embodying the novel features of the present invention.

Fig. 2 is a perspective view of the conveyor turn shown in Fig. 1.

Fig. 3 is a fragmentary sectional view taken along line 3—3 of Fig. 2 illustrating the connection between the eccentrics and the platform bars.

Figure 4:
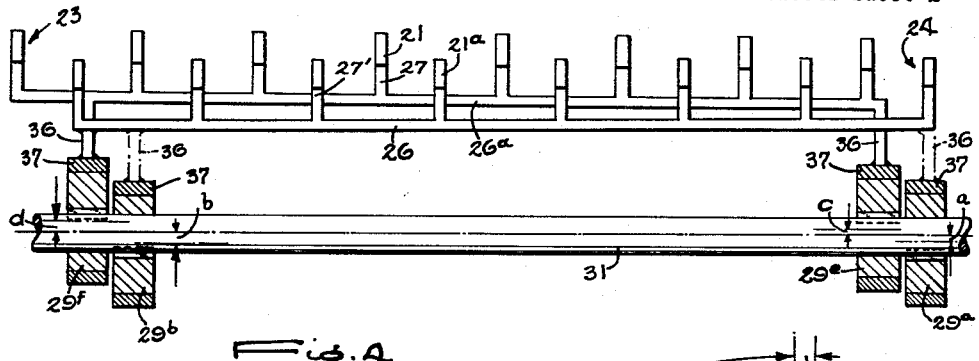
Fig. 4 is an end view of the conveyor.

For purposes of illustration, a conveyor turn 10 embodying the present invention is shown in the drawings disposed between two angularly spaced conveyors 11 and 12. Articles are carried to the receiving end 13 of the turn by one of the conveyors and are carried away from the discharge end 14 of the turn by the other. In the contruction illustrated in the drawings, the conveyors are of the endless belt type and are driven by pulleys 15 and 16 keyed to shafts 17 and 18 powered, through suitable means, by a motor 19.

The turn 10 is in the form of a platform which supports and advances the articles around the turn and which comprises a plurality of platform units, two such units 23 and 24 being employed in the illustrated form of the invention. The platform unit 23 comprises a series of radially spaced parallel bars 21 curved about the common axis 22 of the turn and held together as a unit by common cross members 25 and 26 which extend transversely across the bars at each end of the turn. Formed on each end of the bar 21 is a lug 27 which projects downwardly and is welded to the adjacent one of the cross members 25 and 26, the latter thus joining the bars into a unit of substantially the same width as the conveyors 11 and 12. The other platform unit 24 is similarly constructed having a second series of curved bars 21ª, alternating with the bars of the first unit 23 and formed into a unit by means of cross members 25ª and 26ª similar to the members 25 and 26.

Figure 6:
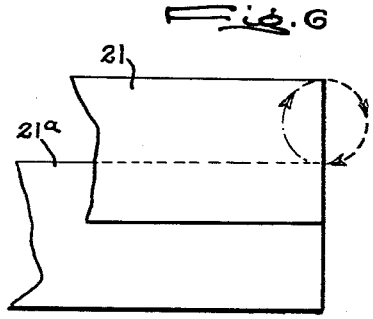
Fig. 6 is a fragmentary view illustrating the orbits of gyration of one unit of parallel bars when both units are gyrated.

The articles are moved in a curved path from one conveyor to the other by gyrating one or more of the platform units 23 and 24. The orbits of gyration of the units are circular as shown in Fig. 6 and thus the bars 21 and 21ª of the units move back and forth relative to each other at the same time as they are moved up and down relative to each other. In describing their circular orbits, the bars of one unit move upwardly past the bars of the other unit and, in doing so, pick up the article resting on the latter. While thus supporting the article, the first unit, in continuing its circular orbit, advances the article forwardly toward the discharge end 14 of the turn. The downward movement of the first unit through the bars of the second unit deposits the article on the second unit and the first unit moves back beneath the second unit to the starting position. The gyrations are continuous thus repeating the sequence described with each gyration advancing the article another step around the turn toward the discharge end 14. While the articles may be advanced by gyrating only one of the platform units 23 and 24, the other being stationary, it is preferred to gyrate both so as to advance the articles more rapidly. When, as in the illustrated form of the invention, both units are gyrated, the gyrations of the two units alternate with each other so that one is moving forward while the other is returning to the starting position.

The present invention contemplates gyrating the units by a simple mechanism whereby the articles will be advanced in a curved path about the axis of the turn. This is achieved by using eccentrics 28 and by arranging the throws of the eccentrics so that the outer bars move further than the inner bars to obtain an arcuate motion of the platform units 23 and 24. To these ends, the magnitude of the throw of each eccentric is directly proportional to the radial spacing of the eccentric 28 from the axis 22 of the turn.

The eccentrics 28 are rotated, thereby gyrating the platform units 23 and 24 in the desired circular orbits, by two horizontal shafts 30 and 31 which radiate from the axis 22 of the turn 10 to underlie the units adjacent each end thereof. The eccentrics 28 are keyed to the shafts 30 and 31 at points near the inner and outer edges of the turn. The shafts are rotated in the same direction and in unison by means of a bevel gear 32 mounted intermediate the ends of the drive shaft 31 to mesh with a similar gear 33 mounted on the end of the driven shaft 30. The extention 34 of the drive shaft 31 is connected to the motor 19 through a speed reducer 35 to rotate the shafts.

While the eccentrics 28 utilized to provide the gyrating movements of the platform units may be in various forms such as, for example, cams and followers, the construction illustrated uses conventional eccentrics 28 having rings or straps 37 surrounding eccentric discs 29ª through 29ʰ. Each eccentric disc rotates relative to the associated strap thus imparting a gyrating movement to it. The cyclical movement of the strap 37 produced by the rotation of the disc is transferred to one of the platform units by a rigid connection between the cross members of the units and the straps of the eccentrics. This connection comprises an upright post 36 having one end fixed to the cross member and the other end fixed to the strap.

In the illustrated form of the invention, each platform unit is supported by four eccentrics. The discharge end 14 of unit 24 is supported and gyrated by an inner and an outer eccentric having discs 29ª and 29ᵇ respectively and spaced along the shaft 31 so that the former is adjacent the inner edge of the turn and the latter is adjacent the outer edge.

Figure 5:
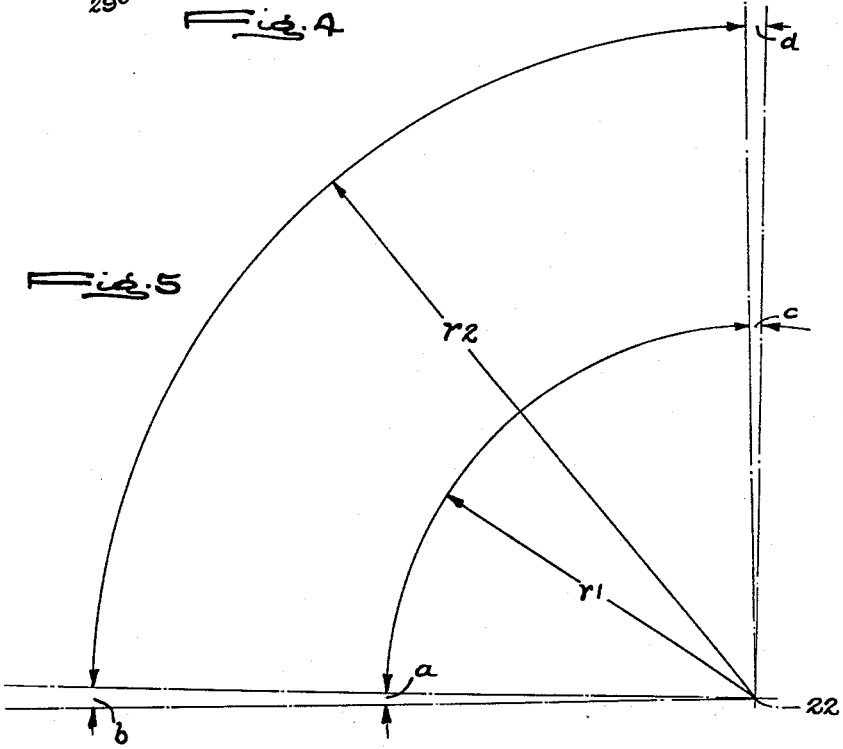
Fig. 5 is a diagram showing the variance between the throw of the inner and outer eccentrics.

The relationship between the spacing of the eccentrics 28 along the shaft 31 from the axis 22 of the turn and the magnitude of the throws of the eccentrics is such as to produce circular orbits of gyration which increase progressively outwardly from the axis of the turn. For this purpose, the throw of the inner eccentric $29^a$ and the outer eccentric $29^b$ (represented by $a$ and $b$ respectively in Fig. 5) are directly proportional to the radial distance, $r^1$ and $r^2$ respectively, of the eccentric from the axis 22. The increase in throws of the eccentrics as the radial distances of the eccentrics from the axis of the turn increases effects an arcuate motion of the platform unit pivoted about the axis 22.

Two eccentrics mounted on the shaft 30 support the opposite end of the platform 24 and have an inner disc $29^c$ and an outer disc (not shown) which are similar to those at the discharge end and impart gyrations similar to those of the discharge end 14 to the receiving end 13. The throws $c$ and $d$ of the inner disc $29^c$ and the outer disc vary in proportion to radial distances $r^1$ and $r^2$ in the same manner as the throws $a$ and $b$ of the disc supporting the opposite end.

Four eccentrics $29^e$ and $29^h$, similar to those described above, support the platform unit 23. The throws of the eccentrics supporting the unit 23 vary in the same manner as the corresponding eccentrics supporting the first unit 24. The eccentric discs $29^e$ through $29^h$ are keyed to the shafts 30 and 31 so that each is adjacent to the corresponding ecentric supporting unit 23 and are displaced relative to the first eccentrics so that the movements of one unit are opposite to the movements of the other unit.

The cross members 25 and 26 of unit 24 are spaced apart along the bars from the cross members $25a$ and $26^a$ of the other unit 23 to provide clearance for the gyration of the units as shown in Fig. 3. Each post 36 projects vertically downward from the corresponding cross member and is mounted off center relative to the eccentrics keyed to the shaft which extends beneath the cross members spaced equal distances from each.

In addition to rotating the eccentrics 28, the shafts also are interconnected with the shafts 17 and 18 which drive the endless belt conveyors 11 and 12 whereby the components can be powered by a single source of power 19. For this purpose, the motor 19 drives the shaft 18 through the speed reducer 25. The shaft 31 is driven by the conveyor shaft 18 by means of a drive mechanism 38 connecting the shaft 18 with the extention 34 of shaft 31. As described above, the shaft 31 rotates the shaft 30 through the medium of the bevel gears 32 and 33 and the shaft 30 drives the shaft 17 by means of a drive mechanism 39 connecting the two shafts. In this manner the power actuator 19 and the drive mechanism can be located within the turn 10 between the angularly spaced conveyors 11 and 12.

I claim:

1. A conveyor turn having, in combination, a series of arcuate radially spaced bars concentric with an upright axis, a second series of arcuate radially spaced bars concentric with said upright axis and alternating with said first bars, two horizontal shafts angularly spaced apart and radiating from said axis to underlie said bars, means supporting said shafts and rotating the same in unison, four similar inner eccentrics, two fixed to each shaft and rotatable therewith, four similar outer eccentrics, two fixed to each shaft spaced along said shaft outwardly of said inner eccentrics and rotatable with the shaft, the throw of said eccentrics increasing progressively and outwardly away from said upright axis, and means connecting two of said inner and two of said outer eccentrics to each of said series of bars to gyrate said bars vertically and in a curved path about said axis thereby to raise, in alternation, one series of bars above the other series while the former move in one direction about the axis and to lower, in alternation, one series of bars below the other during movement in the opposite direction.

2. A conveyor turn having, in combination, a series of arcuate radially spaced bars concentric with an upright axis, a second series of arcuate radially spaced bars concentric with said upright axis and alternating with said first bars, two horizontal shafts angularly spaced apart and radiating from said axis to underlie said bars, means supporting said shafts and rotating the same in unison, two similar eccentrics, one fixed to each shaft and rotatable therewith, a second pair of similar eccentrics, one fixed to each shaft and rotatable therewith, and means connecting said first eccentrics to said first bars and said second eccentrics to said second bars and cooperating with the eccentrics to gyrate said first and second bars bodily in circular orbits about an axis intersecting said upright axis with the orbits of gyration of said bars increasing progressively and outwardly from the upright axis thereby to raise, in alternation, one series of bars above the other series of bars while the former move in one direction about the axis and to lower, in alternation, one series of bars below the other series during movement in the opposite direction.

3. A conveyor turn having, in combination, a series of arcuate radially spaced bars concentric with an upright axis, a second series of arcuate radially spaced bars concentric with said axis and alternating with said bars of said first series, two horizontal shafts angularly spaced apart and radiating from said axis to underlie said bars, means supporting said shafts and rotating the same in unison, two similar inner eccentrics, one fixed to each shaft and rotatable therewith, two similar outer eccentrics, one fixed to each shaft spaced along the shaft from said inner eccentric and rotatable therewith, the throw of said eccentrics increasing progressively and outwardly away from said upright axis, and means connecting said eccentrics and said second series of bars to gyrate the second series of bars vertically and in a curved path about said axis thereby to raise the second bars above said first bars while the former move in one direction about the axis and to lower the second bars below the first bars during movement in the opposite direction.

4. A conveyor turn having, in combination, a series of arcuate radially spaced bars concentric with an upright axis, a second series of arcuate radially spaced bars concentric with said upright axis and alternating with said first bars, two horizontal shafts angularly spaced apart and radiating from said axis to underlie said bars, means supporting said shafts and rotating the same in unison, two similar eccentrics, one fixed to each shaft and rotatable therewith, and means connecting said eccentrics and said second series of bars and cooperating with the eccentrics to gyrate said second bars bodily in circular orbits about an axis intersecting said first axis and extending above and below said first bars with the orbits of gyration of said second bars increasing progressively and outwardly from said upright axis.

5. A conveyor turn having, in combination, a series of arcuate radially spaced bars concentric with an upright axis, a second series of arcuate radially spaced bars concentric with said upright axis and alternating with said first bars, two horizontal shafts radiating from said upright axis to underlie said bars, means supporting said shafts and rotating them in unison, gyrating means connecting said shafts and said first bars and gyrating the latter bodily in circular orbits about an axis intersecting said first axis and extending above and below said second bars with the orbits of gyration of said bars increasing progressively and outwardly away from said upright axis.

6. A conveyor turn having, in combination, a series of arcuate radially spaced bars concentric with an upright axis, a second series of arcuate radially spaced bars concentric with said upright axis and alternating with said first bars, a horizontal shaft underlying said bars, means supporting said shaft and rotating the latter about an axis intersecting said upright axis, two similar eccentrics radially spaced apart along said shaft and rotatable therewith, and means connecting said eccentrics and said second series of bars and cooperating with the eccentrics to gyrate said second bars bodily in circular orbits about an axis intersecting said upright axis and extending above and below said first bars with the orbits of gyration of said second bars increasing progressively and outwardly from said upright axis.

References Cited in the file of this patent

UNITED STATES PATENTS

| | | |
|---|---|---|
| 807,565 | Lorillard | Dec. 19, 1905 |
| 1,343,373 | Pedersen | June 15, 1920 |
| 2,062,535 | Thompson | Dec. 1, 1936 |